US012675491B2

(12) United States Patent
Shtoff et al.

(10) Patent No.: US 12,675,491 B2
(45) Date of Patent: Jul. 7, 2026

(54) SYSTEM AND METHOD FOR PROVIDING SEARCH RESULTS WITH POPULARITY INDICATORS

(71) Applicant: Yahoo Assets LLC, New York, NY (US)

(72) Inventors: Alexander Shtoff, Haifa (IL); Fiana Raiber, Karmiel (IL); Yaroslav Fyodorov, Haifa (IL); Ran Moshe, Zichron Yaakov (IL)

(73) Assignee: Yahoo Assets, LLC, New York, NY (US)

( * ) Notice: Subject to any disclaimer, the term of this patent is extended or adjusted under 35 U.S.C. 154(b) by 0 days.

(21) Appl. No.: 18/961,429

(22) Filed: Nov. 26, 2024

(65) Prior Publication Data

US 2026/0147769 A1 May 28, 2026

(51) Int. Cl.
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
None
See application file for complete search history.

(56) References Cited

U.S. PATENT DOCUMENTS 10,635,679 B2 * 4/2020 Miller ............... G06F 16/24578
11,893,038 B2 * 2/2024 Kovachev .......... G06F 16/2458
11,962,559 B2 4/2024 Kaewka et al.

| 12,235,853 | B1 * | 2/2025 | Tan .................... G06F 16/24578 |
| 12,271,814 | B2 * | 4/2025 | Herdade ................... G06T 7/73 |
| 12,430,343 | B2 * | 9/2025 | Jain ........................ G06F 16/285 |
| 2009/0006388 | A1 * | 1/2009 | Ives ....................... G06F 16/951 |
| | | | 707/999.005 |
| 2019/0318009 | A1 * | 10/2019 | Miller ................... G06F 16/248 |
| 2023/0129763 | A1 * | 4/2023 | Kovachev ......... G06F 16/24522 |
| | | | 707/722 |
| 2024/0193156 | A1 * | 6/2024 | Lin ....................... G06F 18/214 |
| 2024/0373083 | A1 | 11/2024 | Bax et al. |
| 2025/0036645 | A1 * | 1/2025 | Bigdelu .............. G06F 16/2425 |
| 2025/0111012 | A1 * | 4/2025 | Fisher ..................... G06F 17/18 |
| 2025/0217371 | A1 * | 7/2025 | Hamid .................. G06F 40/174 |
| 2025/0245249 | A1 * | 7/2025 | Thunuguntla ......... G06F 40/284 |
| 2025/0265303 | A1 * | 8/2025 | Li ....................... G06F 16/9577 |

OTHER PUBLICATIONS

Query Suggestions Using Query-Flow Graphs (Year: 2009).*

* cited by examiner

*Primary Examiner* — Kim T Nguyen
(74) *Attorney, Agent, or Firm* — Cooper Legal Group LLC

(57) ABSTRACT

In accordance with the present disclosure, one or more computing devices and/or methods are provided. In an example, a query may be received from a client device. In response to the query, a set of search results corresponding to a set of internet resources associated with the query may be generated. The set of search results may include a first search result corresponding to a first internet resource of the set of internet resources. A first popularity score associated with a first search result of the set of search results may be determined based upon one or more first user engagement metrics associated with the first internet resource. A search interface may be displayed on the client device. The search interface may include a first representation of the first search result and a first graphical popularity indicator indicative of the first popularity score.

20 Claims, 8 Drawing Sheets

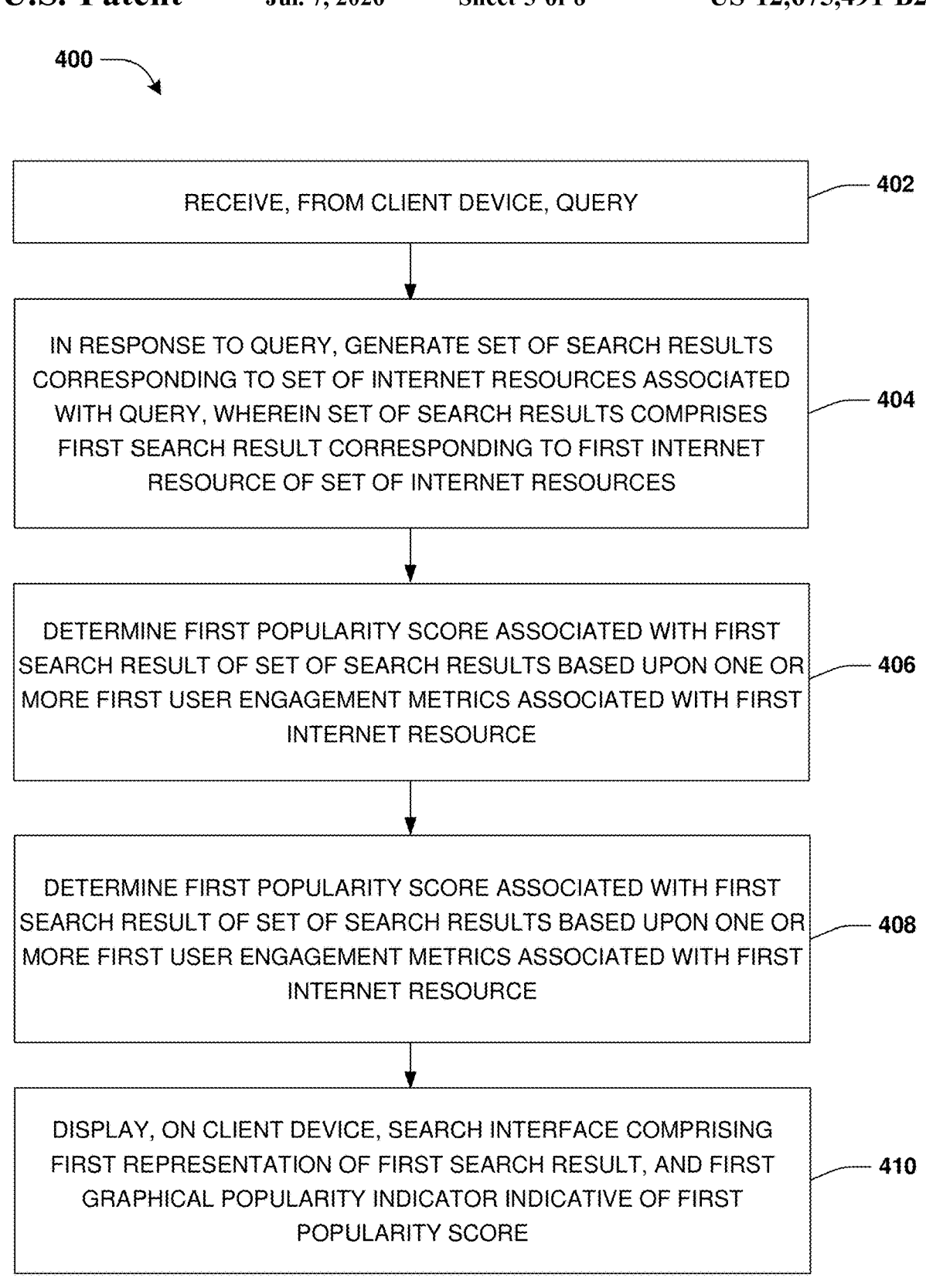

400

RECEIVE, FROM CLIENT DEVICE, QUERY — 402

IN RESPONSE TO QUERY, GENERATE SET OF SEARCH RESULTS CORRESPONDING TO SET OF INTERNET RESOURCES ASSOCIATED WITH QUERY, WHEREIN SET OF SEARCH RESULTS COMPRISES FIRST SEARCH RESULT CORRESPONDING TO FIRST INTERNET RESOURCE OF SET OF INTERNET RESOURCES — 404

DETERMINE FIRST POPULARITY SCORE ASSOCIATED WITH FIRST SEARCH RESULT OF SET OF SEARCH RESULTS BASED UPON ONE OR MORE FIRST USER ENGAGEMENT METRICS ASSOCIATED WITH FIRST INTERNET RESOURCE — 406

DETERMINE FIRST POPULARITY SCORE ASSOCIATED WITH FIRST SEARCH RESULT OF SET OF SEARCH RESULTS BASED UPON ONE OR MORE FIRST USER ENGAGEMENT METRICS ASSOCIATED WITH FIRST INTERNET RESOURCE — 408

DISPLAY, ON CLIENT DEVICE, SEARCH INTERFACE COMPRISING FIRST REPRESENTATION OF FIRST SEARCH RESULT, AND FIRST GRAPHICAL POPULARITY INDICATOR INDICATIVE OF FIRST POPULARITY SCORE — 410

SYSTEM AND METHOD FOR PROVIDING SEARCH RESULTS WITH POPULARITY INDICATORS

BACKGROUND

Many services, such as websites, applications, etc. may provide platforms for navigating through various media items. For example, a user may interact with a search interface to find search results for a query.

SUMMARY

In accordance with the present disclosure, one or more computing devices and/or methods are provided. In an example, a query may be received from a client device. In response to the query, a set of search results corresponding to a set of internet resources associated with the query may be generated. The set of search results may comprise a first search result corresponding to a first internet resource of the set of internet resources. A first popularity score associated with a first search result of the set of search results may be determined based upon one or more first user engagement metrics associated with the first internet resource. A search interface may be displayed on the client device. The search interface may comprise a first representation of the first search result and a first graphical popularity indicator indicative of the first popularity score.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 4 is a flow chart illustrating an example method for providing search results with popularity indicators.

FIG. 5A is a component block diagram illustrating an example system for providing search results with popularity indicators, where a search interface is displayed on a first client device.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
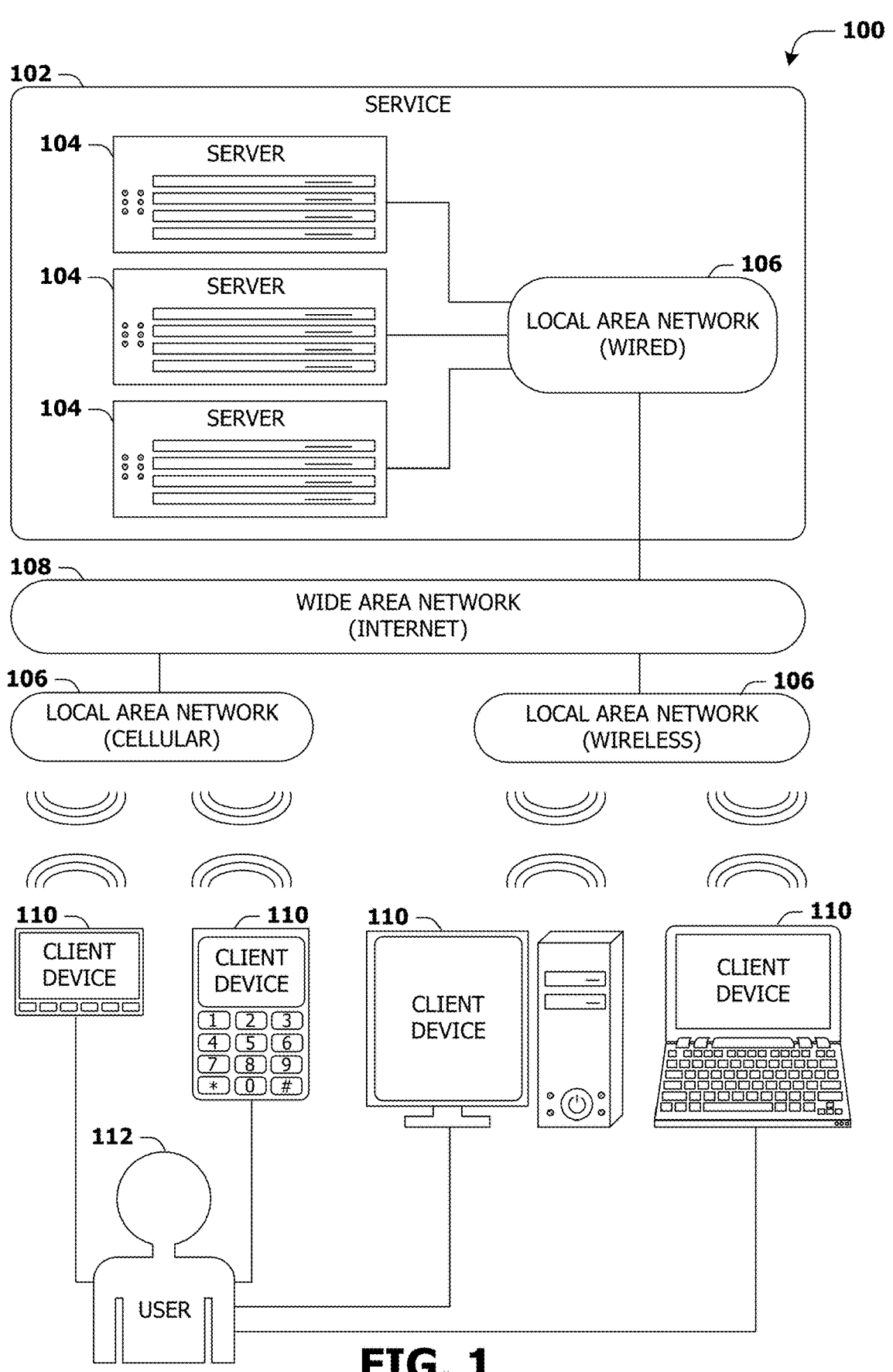
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figures 2, 3:
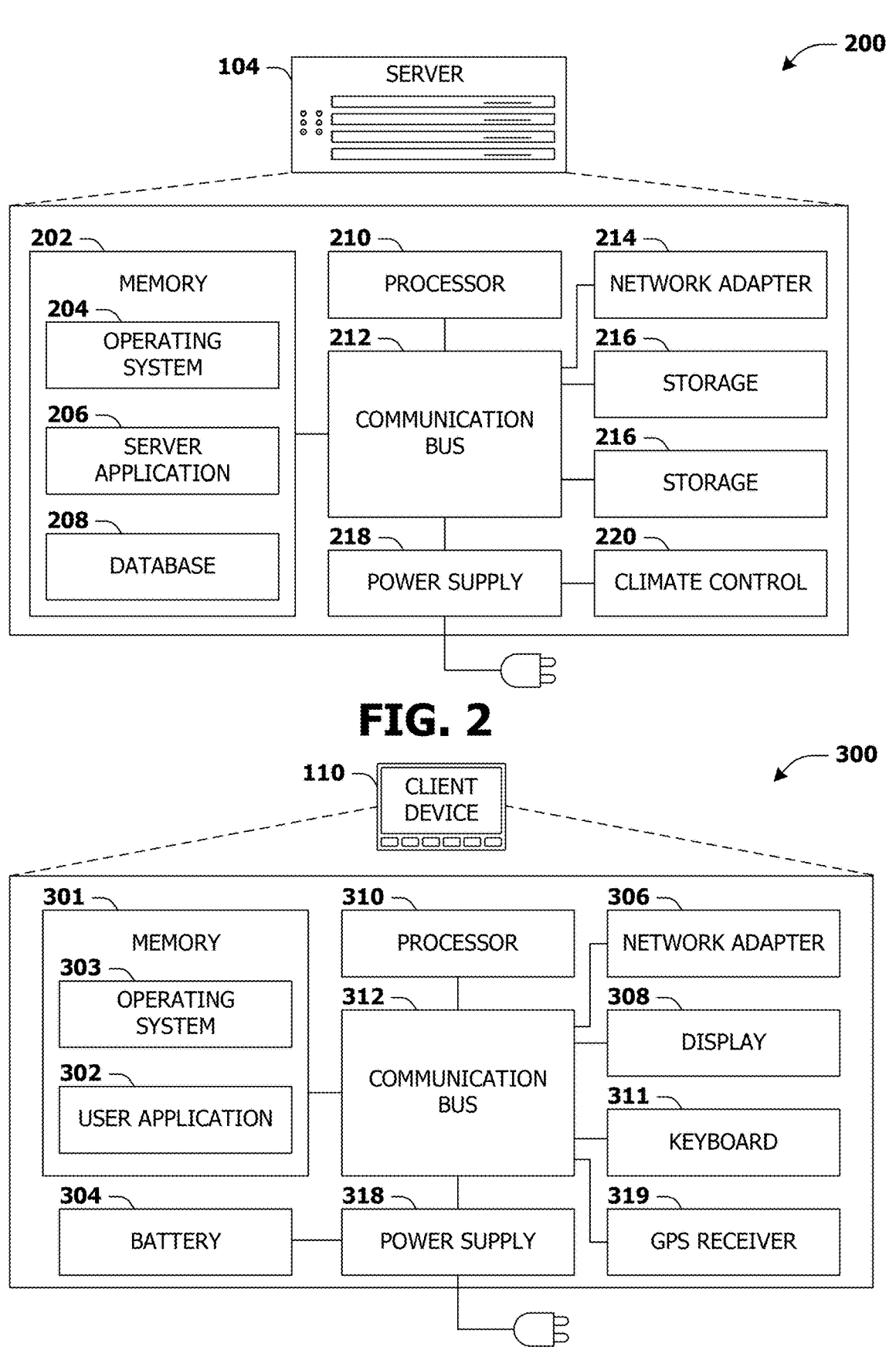
FIG. 2 is an illustration of a scenario involving an example configuration of a server that may utilize and/or implement at least a portion of the techniques presented herein.
FIG. 3 is an illustration of a scenario involving an example configuration of a client that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for providing search results with popularity indicators are provided. In an example, a query may be received from a client device. In response to the query, a set of search results corresponding to a set of internet resources associated with the query may be generated. The set of search results may comprise a first search result corresponding to a first internet resource of the set of internet resources. A first popularity score associated with a first search result of the set of search results may be determined based upon one or more first user engagement metrics associated with the first internet resource. A search interface may be displayed on the client device. The search interface may comprise a first representation of the first search result and a first graphical popularity indicator associated with the first popularity score. The first graphical popularity indicator may be indicative of a popularity (e.g., hotness and/or trendiness) of the first search result corresponding to the first internet resource. Incorporating the first graphical popularity indicator (and/or other graphical popularity indicator) in the search interface may allow a user of the client device to understand a popularity associated with a given search result, and thus may enable the user to make a more informed decision of whether to select the given search result to access a corresponding internet resource (e.g., a webpage to which the search result links to). Many users (e.g., young audiences, shoppers, users interested in trending articles about celebrities, etc.) may benefit from a social experience associated with viewing content that is currently popular and/or trending.

An embodiment of providing search results with popularity indicators is illustrated by an example method 400 of FIG. 4, and is further described in conjunction with a system 501 of FIGS. 5A-5D. In some examples, a content system is provided. A first user, such as user Jill, (and/or a first client device associated with the first user) may access and/or interact with a service provided by the content system. The service may include a search service, a shopping service, a browser, software, a website, an application, an operating system, an email interface, a messaging interface, a music-streaming application, a video application, a news application, etc.

Figure 5A:
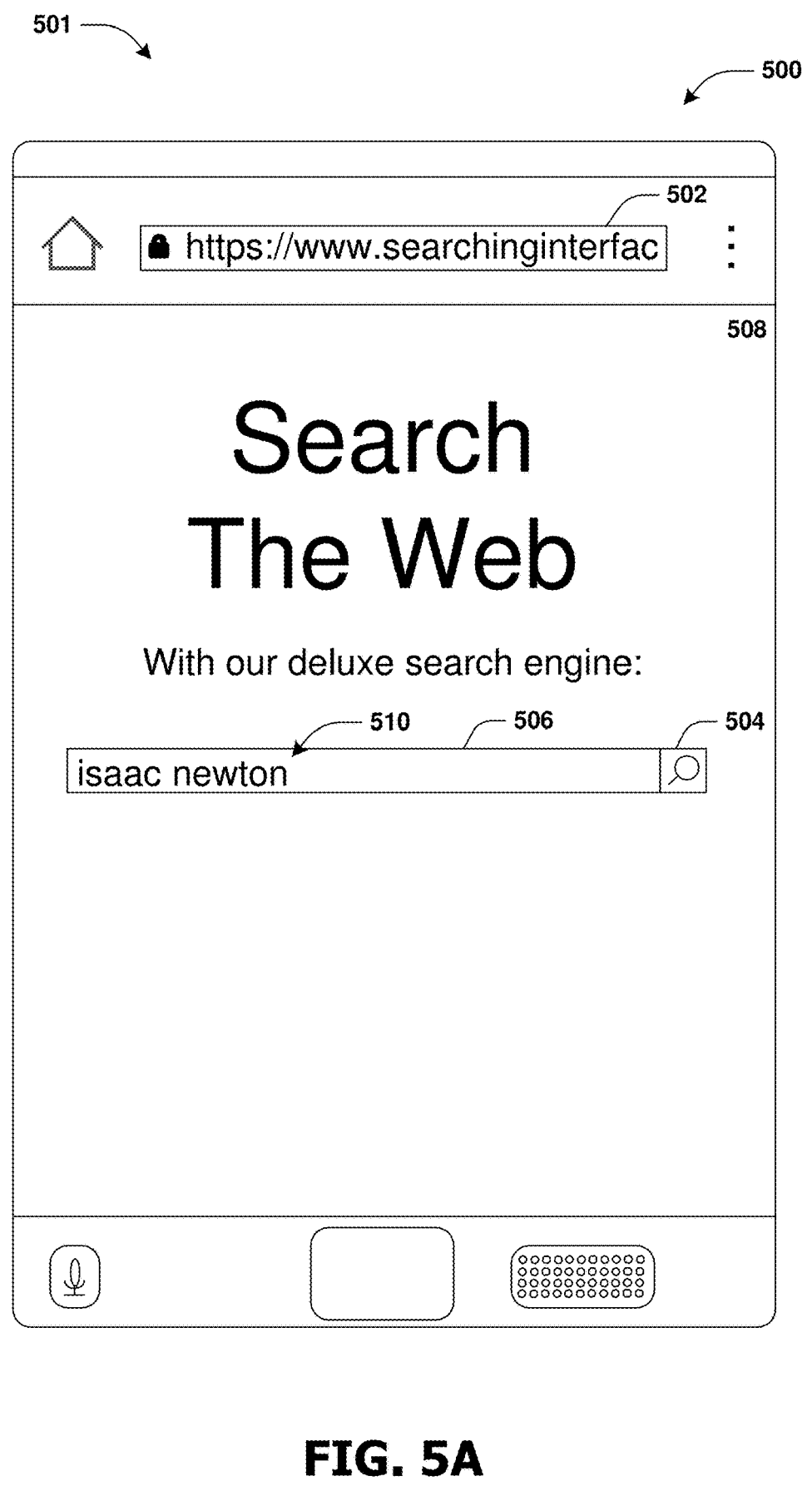

At 402, the content system may receive a first query from the first client device. In some examples, the content system may receive the first query via a search interface displayed on the first client device. In some examples, the content system may provide a search engine used to provide search results in response to queries received via the search interface. FIG. 5A illustrates the first client device (shown with reference number 500) presenting and/or accessing the search interface (shown with reference number 508). The first client device 500 may comprise at least one of a phone, a laptop, a computer, a wearable device, a smart device, a television, any other type of computing device, hardware, etc. The search interface 508 may be displayed via a web page using a browser of the first client device 500. The browser may comprise an address bar 502 comprising a web address (e.g., a URL) of the web page. The search interface 508 may be associated with the search engine (e.g., a web search engine designed to search for information throughout the Internet). In some examples, the search interface 508 may comprise a search field 506. For example, the first query (shown with reference number 510) may be entered into the search field 506. In an example, the first query 510 may comprise text (e.g., "isaac newton"). In some examples, the search interface 508 may comprise a search selectable input 504 corresponding to performing a search based upon the first query 510. The content system may receive the first query 510 in response to a selection of the search selectable input 504.

At 404, the content system may generate a first set of search results corresponding to a first set of internet resources associated with the first query 510. For example, the search engine of the content system may conduct an internet search to find the first set of internet resources to return as search results (e.g., the first set of search results) in response to the first query 510. In some examples, the content system may provide an online shopping platform, and the search engine may perform a search of a shopping database associated with the shopping platform to return the first set of search results corresponding to shopping items related to the first query 510 (e.g., the first query 510 may comprise "women's shoes" and/or the first set of search results may correspond to web pages for purchasing one or more shoes for women). Other types of searches performed by the content system to generate the first set of search results are within the scope of the present disclosure. An internet resource of the first set of internet resources may correspond to a web page and/or at least a portion of an application (e.g., a web application, a mobile application, etc.). In some examples, the first set of search results may be generated based upon a determination that one or more parts of the first query 510 matches one or more parts of each internet resource of the first set of internet resources. In some examples, the first set of search results may be ranked based upon levels of relevance to the first query 510. In some examples, the first set of search results may comprise a subset of a second set of search results determined for the first query 510. For example, the first set of search results may comprise a set of top N ranked search results among the second set of search results. N may be between at least 5 (e.g., top 5 ranked search results) and at most 15 (e.g., top 15 ranked search results). Other values of N are within the scope of the disclosure.

Figure 5B:
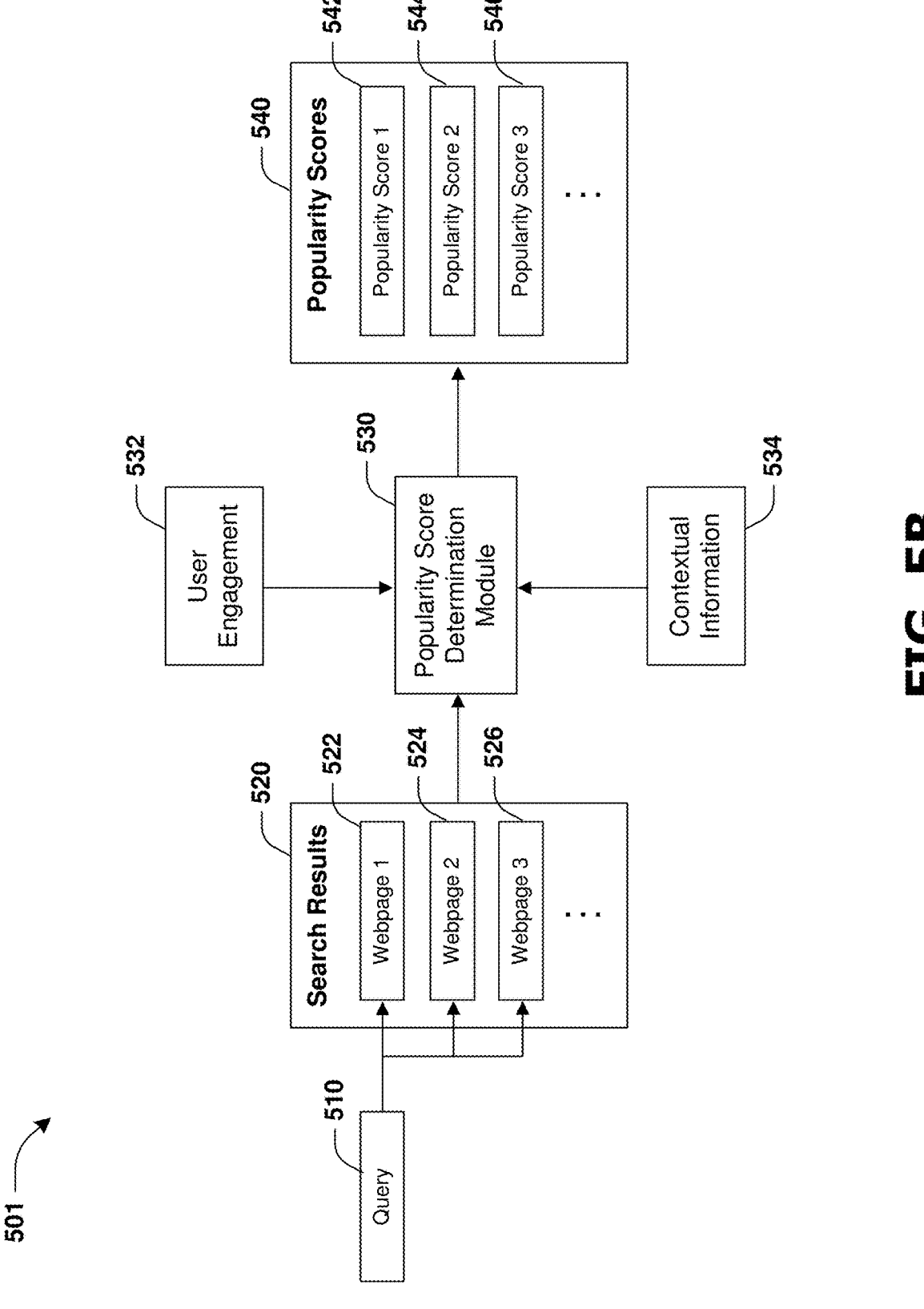
FIG. 5B is a component block diagram illustrating an example system for providing search results with popularity indicators, where popularity scores are determined for search results associated with a received query.

FIG. 5B illustrates a search result data structure 520 determined by the content system based upon the first query 510. The search result data structure 520 may be indicative of the first set of search results ranked based upon levels of relevance to the first query 510. For example, the search result data structure 520 is indicative of a first search result 522 corresponding to a first internet resource (e.g., Webpage 1) of the first set of internet resources, a second search result 524 corresponding to a second internet resource (e.g., Webpage 2) of the first set of internet resources, a third search result 526 corresponding to a third internet resource (e.g., Webpage 3) of the first set of internet resources, and/or one or more other search results. The search result data structure 520 may indicate that at least one of the first search result 522 is a highest ranked search result among the first set of search results with respect to relevance to the first query 510, the second search result 524 is a second-highest ranked search result among the first set of search results with respect to relevance to the first query 510, the third search result 526 is a third-highest ranked search result among the first set of search results with respect to relevance to the first query 510, etc.

At 406, the content system may determine a first popularity score 542 associated with the first search result 522 based upon one or more first user engagement metrics associated with the first internet resource (e.g., Webpage 1). For example, a popularity score determination module 530 (shown in FIG. 5B) of the content system may be used to determine a first set of popularity scores 540 associated with the first set of search results. The first set of popularity scores 540 may comprise the first popularity score 542 associated with the first search result 522, a second popularity score 544 associated with the second search result 524, a third popularity score 546 associated with the third search result 526, and/or one or more other popularity scores associated with one or more other search results of the first set of search results.

In some examples, the popularity score determination module 530 may determine the first set of popularity scores 540 based upon user engagement information 532 associated with the first set of internet resources corresponding to the first set of search results. For example, the user engagement information 532 may be indicative of the one or more first user engagement metrics associated with the first internet resource, one or more second user engagement metrics associated with the second internet resource, one or more third user engagement metrics associated with the third internet resource, and/or other user engagement metrics associated with other internet resources. In some examples, the popularity score determination module 530 may (i) determine the first popularity score 542 associated with the first search result 522 based upon the one or more first user engagement metrics associated with the first internet resource, (ii) determine the second popularity score 544 associated with the second search result 524 based upon the one or more second user engagement metrics associated with the second internet resource, and/or (iii) determine the third popularity score 546 associated with the third search result 526 based upon the one or more third user engagement metrics associated with the third internet resource.

In some examples, the one or more first user engagement metrics may be determined based upon feedback signals indicative of user reactions to search results provided by the content system. For example, prior to receiving the first query 510, the content system may receive a second query from a second client device associated with a second user. In response to the second query, the content system may generate a second set of search results corresponding to a second set of internet resources associated with the second query. The second set of search results may comprise a fourth search result corresponding to the first internet resource. For example, the content system may include the fourth search result (corresponding to the first internet resource) in the second set of search results based upon a determination that the first internet resource is relevant to the second query. The content system may display, on the second client device, a second search interface comprising a representation of the fourth search result corresponding to the first internet resource and/or other representations of other search results of the second set of search results.

The content system may receive a first feedback signal indicative of one or more first user reactions (e.g., reactions by the second user) to display of the second search interface (with the representation of the fourth search result corresponding to the first internet resource) on the second client device. The first feedback signal may be received from the second client device (via one or more user interactions and/or selections associated with the second search interface, for example). Alternatively and/or additionally, the first feedback signal may be received from a device (e.g., a server associated with the first internet resource, etc.) different than the second client device.

In some examples, the first feedback signal may be indicative of whether the fourth search result (corresponding to the first internet resource) was selected via the second search interface. For example, the second user may select the fourth search result on the second search interface if the second user is interested in the first internet resource (and/or if the second user is more interested in the fourth search result corresponding to the first internet resource than other search results of the second set of search results). In some examples, in response to a selection of the fourth search result corresponding to the first internet resource, the second client device may present the first internet resource (e.g., a browser of the second client device may display a representation of Webpage 1).

The first feedback signal may be indicative of one or more follow up actions associated with the second user after the selection of the fourth search result. In some examples, the content system may determine that the second user was not satisfied by the selection of the fourth search result corresponding to the first internet resource (e.g., the first internet resource does not provide content that the second user desires) based upon a determination that the one or more follow up actions include (i) the second user redirecting the second client device back to the second set of search results following the selection of the fourth search result, (ii) the second user selecting a different selection (other than the fourth search result corresponding to the first internet resource) from among the second set of search results, and/or (iii) the second user making a new query (different than and/or related to the second query) to be provided with a new set of search results. In some examples, the content system may determine that the second user was satisfied by the selection of the fourth search result corresponding to the first internet resource (e.g., the first internet resource provides content that the second user desires) based upon a determination that the second user did not redirect the second client device back to the second set of search results following the selection of the fourth search result.

In some examples, the content system may determine the one or more first user engagement metrics associated with the first internet resource based upon the first feedback signal and/or other feedback signals (e.g., other feedback signals indicative of whether search results corresponding to the first internet resource are selected and/or whether users are satisfied by selections). In some examples, the one or more first user engagement metrics may be indicative of a measure of search result selections associated with the first internet resource. For example, the measure of search result selections may be indicative of a measure (e.g., at least one of a quantity, a rate, etc.) of selections of the first internet resource by search engine users over a first period of time (e.g., a most recent period of a predefined duration, such as a duration of one or more hours, a duration of one or more days, a duration of one or more weeks, etc.). The second query may be received and/or the second search interface with the fourth search result corresponding to the first internet resource may be provided via the second client device during the first period of time. In an example, the content system may increase (e.g., increment) the measure of search result selections based upon the first feedback signal being indicative of the second user having selected the fourth search result corresponding to the first internet resource and/or the second client device accessing the first internet resource.

In some examples, the one or more first user engagement metrics may be indicative of a measure of satisfied search result selections associated with the first internet resource. For example, the measure of satisfied search result selections may be indicative of a measure (e.g., at least one of a quantity, a rate, etc.) of selections of the first internet resource by search engine users over the first period of time that resulted in user satisfaction. In an example, the content system may increase (e.g., increment) the measure of satisfied search result selections based upon a determination, based upon the first feedback signal, that the second user was satisfied by the selection of the fourth search result corresponding to the first internet resource.

In some examples, the one or more first user engagement metrics may be indicative of a measure of dissatisfied search result selections associated with the first internet resource. For example, the measure of dissatisfied search result selections may be indicative of a measure (e.g., at least one of a quantity, a rate, etc.) of selections of the first internet resource by search engine users over the first period of time that did not result in user satisfaction. In an example, the content system may increase (e.g., increment) the measure of dissatisfied search result selections based upon a determination, based upon the first feedback signal, that the second user was not satisfied by the selection of the fourth search result corresponding to the first internet resource.

In some examples, the one or more first user engagement metrics may comprise one or more traffic volume metrics associated with the first internet resource. The one or more traffic volume metrics may be indicative of at least one of a measure (e.g., quantity, rate, etc.) of views (e.g., webpage views) associated with the first internet resource during the first period of time, a measure of unique visitors to the first internet resource during the first period of time, a measure of user sessions with the first internet resource during the first period of time, an average session duration, a bounce rate, pages per session, scroll depth, engagement rate, etc.

In some examples, the popularity score determination module 530 may perform one or more operations (e.g., mathematical operations) using the one or more first user engagement metrics (e.g., at least one of the measure of search result selections, the measure of satisfied search result selections, the measure of dissatisfied search result selections, etc.) to determine the first popularity score 542 associated with the first search result 522. In some examples, the first popularity score 542 may be a function of the measure of search result selections associated with the first internet resource, where an increase of the measure of search result selections may correspond to an increased value of the first popularity score 542. In some examples, the first popularity score 542 may be a function of the measure of search result selections, where an increase of the measure of search result selections may correspond to an increased value of the first popularity score 542. In some examples, the first popularity score 542 may be a function of a traffic volume of the one or more traffic volume metrics, where an increase of a traffic volume metric of the one or more traffic volume metrics may correspond to an increased or decreased value of the first popularity score 542 (e.g., an increased measure of unique visitors to the first internet resource may result in an increased value of the first popularity score 542 and/or an increased bounce rate may result in a decreased value of the first popularity score 542).

In some examples, the popularity score determination module 530 may determine the first set of popularity scores 540 based upon contextual information 534 associated with the first query 510. For example, the contextual information 534 may be indicative of (i) the first query 510, (ii) one or more characteristics of the first query 510, (iii) a first location associated with the first client device 500 and/or a first time of day at the first location, (iv) a first device type associated with the first client device 500, (v) a first age associated with the first user, (vi) a first gender associated with the first user, (vii) one or more first topics of interest associated with the first user, (viii) one or more previously accessed content items associated with the first user, and/or (ix) other information associated with the first user and/or the first query 510. The first location may comprise a geolocation of the first client device 500 and/or at least one of a city, town, geographical area, zip code, etc. associated with the first user.

In some examples, the popularity score determination module 530 may comprise a popularity score determination machine learning model configured to determine the first set of popularity scores 540 based upon the contextual information 534 and/or the user engagement information 532. The popularity score determination machine learning model may, for example, comprise at least one of a neural network, a tree-based model, a machine learning model used to perform linear regression, a machine learning model used to perform logistic regression, a decision tree model, a support vector machine (SVM), a Bayesian network model, a k-Nearest Neighbors (k-NN) model, a K-Means model, a random forest model, a machine learning model used to perform dimensional reduction, a machine learning model used to perform gradient boosting, etc.

In some examples, the popularity score determination machine learning model may be trained using first training information indicative of a plurality of sets of search event information associated a plurality of historical search events by one or more users. For example, the plurality of sets of search event information may comprise (i) a first set of search event information associated with a first historical search event of the plurality of historical search events, (ii) a second set of search event information associated with a second historical search event of the plurality of historical search events, and/or (iii) one or more other sets of search event information associated with one or more other historical search events of the plurality of historical search events.

In some examples, the first set of search event information may be indicative of (i) a first historical query associated with the first historical search event (e.g., the first historical query may be submitted by a third user to the content system via a search interface such as at least one of the search interface 508, the second search interface, etc.), (ii) a first set of historical search results generated and/or provided by the content system in response to the first historical query, (iii) one or more user reactions by the third user to display of the first set of historical search results (e.g., the one or more user reactions may comprise at least one of a selection of a search result among the first set of historical search results by the third user, one or more follow up actions associated with the third user after the selection of the search result, etc.), and/or (iv) first historical contextual information associated with the first historical query. The first historical contextual information may be indicative of (i) the first historical query, (ii) one or more characteristics of the first historical query, (iii) a location associated with the third user and/or a third client device associated with the third user, (iv) a device type associated with the third client device, (v) an age associated with the third user, (vi) a gender associated with the third user, (vii) one or more topics of interest associated with the third user, (viii) one or more previously accessed content items associated with the third user, and/or (ix) other information associated with the third user and/or the first historical query.

In some examples, the second set of search event information may be indicative of (i) a second historical query associated with the second historical search event (e.g., the second historical query may be submitted by a fourth user to the content system via a search interface such as at least one of the search interface 508, the second search interface, etc.), (ii) a second set of historical search results generated and/or provided by the content system in response to the second historical query, (iii) one or more user reactions by the fourth user to display of the second set of historical search results (e.g., the one or more user reactions may comprise at least one of a selection of a search result among the second set of historical search results by the fourth user, one or more follow up actions associated with the fourth user after the selection of the search result, etc.), and/or (iv) second historical contextual information associated with the second historical query. The second historical contextual information may be indicative of (i) the second historical query, (ii)

one or more characteristics of the second historical query, (iii) a location associated with the fourth user and/or a fourth client device associated with the fourth user, (iv) a device type associated with the fourth client device, (v) an age associated with the fourth user, (vi) a gender associated with the fourth user, (vii) one or more topics of interest associated with the fourth user, (viii) one or more previously accessed content items associated with the fourth user, and/or (ix) other information associated with the fourth user and/or the second historical query.

In some examples, a first training process may be performed (using the first training information with the plurality of sets of search event information, for example) to train the popularity score determination machine learning model to take the contextual information 534 into account when determining the first set of popularity scores 540. In some examples, the popularity score determination machine learning model may be trained as a logistic regression model (and/or other type of model) where search result selection events associated with the first internet resource may be interpreted by the popularity score determination machine learning model to be positive events and/or search result non-selection events associated with the first internet resource may be interpreted by the popularity score determination machine learning model to be negative events. A search result selection event associated with the first internet resource may correspond to an event in which a user selects a search result corresponding to the first internet resource. A search result non-selection event associated with the first internet resource may correspond to a search event in which a user does not select a search result corresponding to the first internet resource.

In some examples, the first training process may include (i) analyzing the training information to determine a positive subset of historical search events, among the plurality of historical search events, that include search result selection events associated with the first internet resource (e.g., in each historical search event of the positive subset of historical search events, a user selects a search result corresponding to the first internet resource), (ii) learning, based upon the first training information (e.g., based upon contextual information, indicated by the first training information, associated with the positive subset of historical search events) and/or the positive subset of historical search events, one or more positive relationships between positive historical search events (of the positive subset of historical search events) and one or more contextual features (e.g., at least one of location, device type, age, gender, topic of interest, etc.), and/or (iii) performing one or training operations on the popularity score determination machine learning model based upon the one or more learned positive relationships, wherein the one or training operations may comprise modifying one or more weights of the popularity score determination machine learning model, creating, modifying and/or removing one or more neural links of the popularity score determination machine learning model, and/or one or more other training operations.

In some examples, the first training process performed to train the popularity score determination machine learning model may include (i) analyzing the first training information to determine a negative subset of historical search events, among the plurality of historical search events, that do not include search result selection events associated with the first internet resource (e.g., in each historical search event of the negative subset of historical search events, a user does not select a search result corresponding to the first internet resource), (ii) learning, based upon the first training information (e.g., based upon contextual information, indicated by the first training information, associated with the negative subset of historical search events) and/or the negative subset of historical search events, one or more negative relationships between negative historical search events (of the negative subset of historical search events) and one or more contextual features (e.g., at least one of location, device type, age, gender, topic of interest, etc.), and/or (iii) performing one or training operations on the popularity score determination machine learning model based upon the one or more learned negative relationships, wherein the one or training operations may comprise modifying one or more weights of the popularity score determination machine learning model, creating, modifying and/or removing one or more neural links of the popularity score determination machine learning model, and/or one or more other training operations.

In some examples, the popularity score determination machine learning model may comprise a prediction model configured to determine (e.g., predict) one or more user engagement predictions associated with the first internet resource based upon the user engagement information 532 associated with the first set of internet resources and/or the contextual information 534 associated with the first query 510. The one or more user engagement predictions may be indicative of (i) a predicted measure of search result selections associated with the first internet resource over a second period of time (e.g., a period of time comprising a current time and/or time in the future), (ii) a predicted measure of satisfied search result selections associated with the first internet resource over the second period of time, (iii) a predicted measure of dissatisfied search result selections associated with the first internet resource, and/or (iv) one or more predicted traffic volume metrics associated with the first internet resource over the second period of time. In some examples, the prediction model may determine the one or more user engagement predictions based upon the contextual information 534 and/or the one or more first user engagement metrics (e.g., at least one of the measure of search result selections, the measure of satisfied search result selections, the measure of dissatisfied search result selections, etc.). In an example, the prediction model may comprise a count regression model (e.g., a Poisson model and/or a negative binomial model) that learns to predict user engagement metrics (e.g., daily metrics, hourly metrics, etc.) associated with internet resources and/or search results.

In some examples, the prediction model may take the contextual information 534 into account when determining the one or more user engagement predictions. For example, a prediction of the one or more user engagement predictions (e.g., the predicted measure of search result selections, the predicted measure of satisfied search result selections, the predicted measure of dissatisfied search result selections, etc.) may be context-dependent predictions associated with at least one of the first query 510, the one or more characteristics of the first query 510, the first location associated with the first client device 500, the first time of day, the first device type, the first age, the first gender, the one or more first topics of interest, etc. In some examples, the prediction model may determine the one or more user engagement predictions via generalization and/or extrapolation. In some examples, the prediction model may not have access to (and/or may have limited access to) feedback associated with user activity of users in a geographical area (e.g., a city) associated with the first location. The prediction model may extrapolate feedback associated with other geographical areas to the geographical area to determine location-dependent user engagement predictions (e.g., the one or more user engagement predictions) and/or location-dependent popularity scores (e.g., the first set of popularity scores 540) associated with the first location.

In some examples, the popularity score determination module 530 may perform one or more operations (e.g., mathematical operations) using the one or more user engagement predictions (e.g., at least one of the predicted measure of search result selections, the predicted measure of satisfied search result selections, the predicted measure of dissatisfied search result selections, a predicted traffic volume metric associated with the first internet resource, etc.) to determine the first popularity score 542 associated with the first search result 522. In some examples, the first popularity score 542 may be a function of the predicted measure of search result selections associated with the first internet resource, where an increase of the predicted measure of search result selections may correspond to an increased value of the first popularity score 542. In some examples, the first popularity score 542 may be a function of the predicted measure of search result selections, where an increase of the predicted measure of search result selections may correspond to an increased value of the first popularity score 542. In some examples, the first popularity score 542 may be a function of a predicted traffic volume of the one or more predicted traffic volume metrics, where an increase of a predicted traffic volume metric of the one or more predicted traffic volume metrics may correspond to an increased or decreased value of the first popularity score 542.

In some examples, other popularity scores (e.g., at least one of the second popularity score 544 associated with the second search result 524, the third popularity score 546 associated with the third search result 526, etc.) of the first set of popularity scores 540 may be determined using one or more of the techniques provided herein with respect to determining the first popularity score 542 associated with the first search result 522.

In some examples, the popularity score determination machine learning model may be updated by performing one or more subsequent training processes on the popularity score determination machine learning model after the first training process. For example, the one or more subsequent training processes may be performed periodically or in an aperiodic manner. A training process of the one or more subsequent training processes may be performed using updated training information (e.g., more recent than the first training information) such that the popularity score determination machine learning model adjusts accordingly in response to one or more changing popularity trends.

In some examples, based upon the first set of popularity scores 540, the content system may generate one or more first graphical popularity indicators and/or assign the one or more first graphical popularity indicators to one or more search results of the first set of search results. For example, the content system may (i) generate a first graphical popularity indicator 572 (shown in FIG. 5C) based upon the first popularity score 542 associated with the first search result 522 corresponding to the first internet resource, and/or (ii) assign the first graphical popularity indicator 572 to the first search result 522. The first graphical popularity indicator 572 may be indicative of the first popularity score 542 (e.g., the first graphical popularity indicator 572 may comprise a visual representation of the first popularity score 542). Alternatively and/or additionally, the content system may (i) generate a second graphical popularity indicator 574 (shown in FIG. 5C) based upon the second popularity score 544 associated with the second search result 524 corresponding to the second internet resource, and/or (ii) assign the second graphical popularity indicator 574 to the second search result 524. The second graphical popularity indicator 574 may be indicative of the second popularity score 544 (e.g., the second graphical popularity indicator 574 may comprise a visual representation of the second popularity score 544). Alternatively and/or additionally, the content system may (i) generate a third graphical popularity indicator 576 (shown in FIG. 5C) based upon the third popularity score 546 associated with the third search result 526 corresponding to the third internet resource, and/or (ii) assign the third graphical popularity indicator 576 to the third search result 526. The third graphical popularity indicator 576 may be indicative of the third popularity score 546 (e.g., the third graphical popularity indicator 576 may comprise a visual representation of the third popularity score 546).

At 408, the content system may display, on the first client device 500, the search interface 508 comprising representations of search results of the first set of search results and/or the one or more one or more first graphical popularity indicators associated with search results of the first set of search results.

For example, the search interface 508 may display a first representation 562 of the first search result 522, a second representation 564 of the second search result 524, a third representation 566 of the third search result 526 and/or one or more or more other representations of one or more other search results of the first set of search results. In some examples, representations of search results may be arranged based upon relevance rankings associated with the search results. For example, the search interface 508 may display the first representation 562 of the first search result 522 to be higher than and/or over the second representation 564 of the second search result 524 based upon the first search result 522 being ranked higher than the second search result 524 with respect to relevance to the first query 510. Alternatively and/or additionally, the search interface 508 may display the second representation 564 of the second search result 524 to be higher than and/or over the third representation 566 of the third search result 526 based upon the second search result 524 being ranked higher than the search result 526 with respect to relevance to the first query 510. In some examples, the search interface 508 may display a set of image search results 578 associated with the first query 510.

In some examples, the first representation 562 of the first search result 522 may comprise at least one of a link (e.g., uniform resource locator (URL)) to the first internet resource, a preview of the first internet resource, a title associated with the first internet resource, etc. In response to a selection of the first representation 562 of the first search result 522 (e.g., the first user clicking on the first representation 562), a browser of the first client device 500 may access and/or present the first internet resource. The second representation 564 of the second search result 524 may comprise at least one of a link (e.g., URL) to the second internet resource, a preview of the second internet resource, a title associated with the second internet resource, etc. In response to a selection of the second representation 564 of the second search result 524 (e.g., the first user clicking on the second representation 564), the browser of the first client device 500 may access and/or present the second internet resource. The third representation 566 of the third search result 526 may comprise at least one of a link (e.g., URL) to the third internet resource, a preview of the third internet resource, a title associated with the third internet resource, etc. In response to a selection of the third representation 566 of the third search result 526 (e.g., the first user clicking on the third representation 566), the browser of the first client device 500 may access and/or present the third internet resource.

In some examples, the search interface 508 may display the first graphical popularity indicator 572 to be adjacent to the first representation 562 of the first search result 522 and/or to overlay the first representation 562 of the first search result 522. The search interface 508 may display the second graphical popularity indicator 574 to be adjacent to the second representation 564 of the second search result 524 and/or to overlay the second representation 564 of the second search result 524. The search interface 508 may display the third graphical popularity indicator 576 to be adjacent to the third representation 566 of the third search result 526 and/or to overlay the third representation 566 of the third search result 526.

Figure 5C:
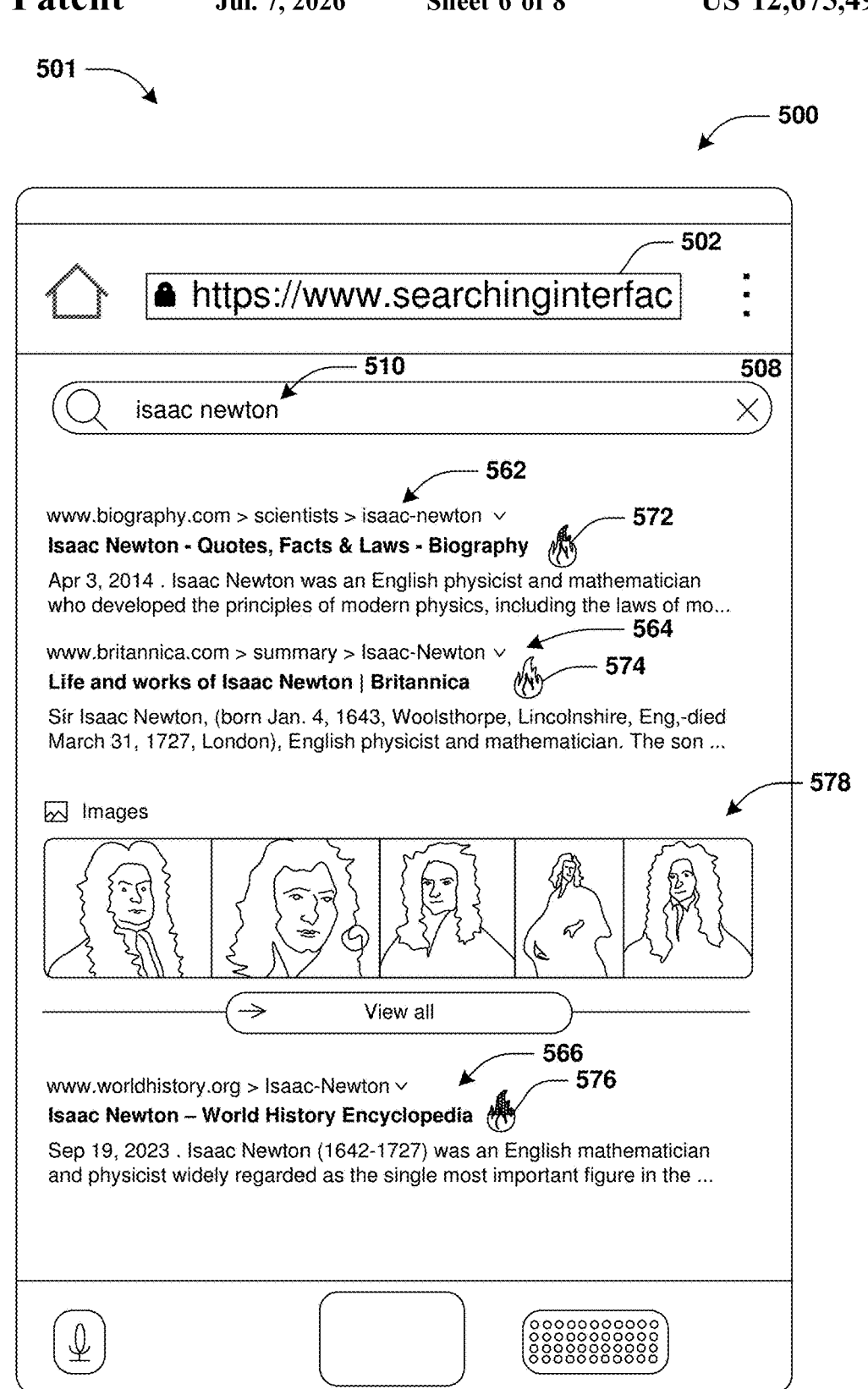
FIG. 5C is a component block diagram illustrating an example system for providing search results with popularity indicators, where graphical popularity indicators are displayed via a search interface on a first client device.

In some examples, a graphical popularity indicator of the one or more first graphical popularity indicators may comprise an icon, such as a flame icon shown in FIG. 5C or one or more other types of icons. A visual feature of the icon may be controlled based upon a popularity score that the graphical popularity indicator is configured to visually represent. In an example, the visual feature may correspond to a fill level of the flame icon. For example, the content system may determine one or more fill levels associated with the one or more first graphical popularity indicators based upon the first set of popularity scores 540.

In some examples, the first set of popularity scores 540 may be normalized such that each popularity score of the first set of popularity scores 540 fits within a common scale (e.g., 0 to 1 or other scale). In an example, min-max normalization, z-score normalization, or other type of normalization is performed on a first version of the first set of popularity scores 540 to determine an updated version of the first set of popularity scores 540. In an example, the first version of the first set of popularity scores 540 may comprise (i) a first version of the first popularity score 542 equal to 72, (ii) a first version of the second popularity score 544 equal to 120, and/or (iii) a first version of the third popularity score 546 equal to 48. In an example, the first version of the first popularity score 542 may be set to 72 based upon the measure of search result selections of the one or more first user engagement metrics indicating that there were 72 selections of the first internet resource by search engine users over the first period of time. Alternatively and/or additionally, the first version of the first popularity score 542 may be set to 72 based upon the predicted measure of search result selections being indicative of 72 selections of the first internet resource by search engine users over the second period of time.

The content system may determine a normalization factor based upon the first version of the first set of popularity scores 540 and/or the common scale. The content system may apply the normalization factor to the first version of the first set of popularity scores 540 to generate the updated version of the first set of popularity scores 540. In an example, the normalization factor may be determined to be $\frac{1}{120}$ based upon (i) a maximum value of the common scale being 1 and/or (ii) 120 (e.g., the first version of the second popularity score 544) being determined to be the highest popularity score among the first version of the first set of popularity scores 540. In an example, the content system may (i) apply the normalization factor (e.g., $\frac{1}{120}$) to the first version of the first popularity score 542 (e.g., 72) to generate an updated version of the second popularity score 544 equal to 0.6, (ii) apply the normalization factor (e.g., $\frac{1}{120}$) to the first version of the second popularity score 544 (e.g., 120) to generate an updated version of the second popularity score 544 equal to 1, and/or (iii) apply the normalization factor (e.g., $\frac{1}{120}$) to the first version of the third popularity score 546 (e.g., 48) to generate an updated version of the third popularity score 546 equal to 0.4.

In an example shown in FIG. 5C, the content system may (i) generate the first graphical popularity indicator 572 to comprise a flame icon with about a 60% fill level (e.g., about 60% of the flame icon is a first color, such as red, orange, or other color and/or about 40% of the flame icon is a second color, such as gray and/or black) based upon the first popularity score 542 (e.g., the updated version of the first popularity score 542) being equal to 0.6, (ii) generate the second graphical popularity indicator 574 to comprise a flame icon with about a 100% fill level (e.g., about 100% of the flame icon is the first color) based upon the second popularity score 544 (e.g., the updated version of the second popularity score 544) being equal to 1, and/or (iii) generate the third graphical popularity indicator 576 to comprise a flame icon with about a 40% fill level (e.g., about 40% of the flame icon is the first color and/or about 60% of the flame icon is the second color) based upon the third popularity score 546 (e.g., the updated version of the third popularity score 546) being equal to 0.4.

In some examples, the popularity score determination module 530 taking contextual information into account to determine popularity scores may result in the popularity score determination module 530 determining different popularity scores for search results corresponding to the same internet resource. In an example, the content system may receive a second query 570 (shown in FIG. 5D) from a second client device 550 (shown in FIG. 5D). For example, the second query 570 may be received from the second client device 550 via a second search interface 568 (shown in FIG. 5D) displayed on the second client device 550.

The content system may generate a second set of search results corresponding to a second set of internet resources associated with the second query 570. For example, the search engine of the content system may conduct an internet search to find the second set of internet resources to return as search results (e.g., the second set of search results) in response to the second query 570. An internet resource of the second set of internet resources may correspond to a web page and/or at least a portion of an application (e.g., a web application, a mobile application, etc.). In some examples, the second set of search results may be generated based upon a determination that one or more parts of the second query 570 matches one or more parts of each internet resource of the second set of internet resources. In some examples, the second set of search results may be ranked based upon levels of relevance to the second query 570. In some examples, the second set of search results may comprise a subset of a second set of search results determined for the second query 570. For example, the second set of search results may comprise a set of top P ranked search results among the second set of search results. P may be between at least 5 (e.g., top 5 ranked search results) and at most 15 (e.g., top 15 ranked search results). Other values of P are within the scope of the disclosure.

The content system may generate a second search result data structure based upon the second query 570. The second search result data structure may be indicative of the second set of search results ranked based upon levels of relevance to the second query 570. For example, the second search result data structure may be indicative of a fourth search result corresponding to the first internet resource (e.g., Webpage 1) of the second set of internet resources, a fifth result corresponding to the first internet resource (e.g., Webpage 1) of the second set of internet resources, a fifth search result corresponding to the second internet resource (e.g., Webpage 2) of the second set of internet resources, a sixth search result corresponding to the third internet resource (e.g., Webpage 3) of the second set of internet resources, and/or one or more other search results. The second search result data structure may indicate that at least one of the fourth search result is a highest ranked search result among the second set of search results with respect to relevance to the second query 570, the fifth search result is a second-highest ranked search result among the second set of search results with respect to relevance to the second query 570, the sixth search result is a third-highest ranked search result among the second set of search results with respect to relevance to the second query 570, etc.

In an example, the second set of internet resources corresponding to the second set of search results determined for the second query 570 may be the same as and/or similar to the first set of internet resources corresponding to the first set of search results determined for the first query 510 due to the second query 570 being the same as and/or similar to the first query 510 (e.g., both the second query 570 and the first query 510 include "isaac newton"). In an example, rankings of the second set of internet resources according to the second search result data structure may be the same as and/or similar to rankings of the first set of internet resources according to the search result data structure 520 due to the second query 570 being the same as and/or similar to the first query 510. For example, both the search result data structure 520 and the second search result data structure may indicate that the first internet resource (e.g., Webpage 1) corresponds to the highest-ranked search result, the second internet resource (e.g., Webpage 2) corresponds to second highest-ranked search result, etc.

The popularity score determination module 530 (shown in FIG. 5B) of the content system may determine a second set of popularity scores associated with the second set of search results. The second set of popularity scores may comprise a fourth popularity score associated with the fourth search result, a fifth popularity score associated with the fifth search result, a sixth popularity score associated with the sixth search result, and/or one or more other popularity scores associated with one or more other search results of the second set of search results.

In some examples, the popularity score determination module 530 may determine the second set of popularity scores based upon second user engagement information associated with the second set of internet resources corresponding to the second set of search results. For example, the second user engagement information may be indicative of one or more fourth user engagement metrics associated with the first internet resource, one or more fifth user engagement metrics associated with the second internet resource, one or more sixth user engagement metrics associated with the third internet resource, and/or other user engagement metrics associated with other internet resources. The one or more fourth user engagement metrics associated with the first internet resource may be the same as or different than the one or more first user engagement metrics associated with the first internet resource. In some examples, the popularity score determination module 530 may (i) determine the fourth popularity score associated with the fourth search result based upon the one or more fourth user engagement metrics associated with the first internet resource, (ii) determine the fifth popularity score associated with the fifth search result based upon the one or more fifth user engagement metrics associated with the second internet resource, and/or (iii) determine the sixth popularity score associated with the sixth search result based upon the one or more sixth user engagement metrics associated with the third internet resource.

In some examples, the one or more fourth user engagement metrics may be determined based upon feedback signals indicative of user reactions to search results provided by the content system, such as the first feedback signal and/or other feedback signals associated with search results corresponding to the first internet resource. In some examples, the one or more fourth user engagement metrics may be indicative of at least one of a measure of search result selections associated with the first internet resource, a measure of satisfied search result selections associated with the first internet resource, a measure of dissatisfied search result selections associated with the first internet resource, one or more traffic volume metrics associated with the first internet resource, etc.

In some examples, the popularity score determination module 530 may determine the second set of popularity scores based upon second contextual information associated with the second query 570. For example, the second contextual information may be indicative of (i) the second query 570, (ii) one or more characteristics of the second query 570, (iii) a second location associated with the second client device 550 and/or a second time of day at the second location, (iv) a second device type associated with the second client device 550, (v) a second age associated with the second user, (vi) a second gender associated with the second user, (vii) one or more second topics of interest associated with the second user, (viii) one or more previously accessed content items associated with the second user, and/or (ix) other information associated with the second user and/or the second query 570. The second location may comprise a geolocation of the second client device 550 and/or at least one of a city, town, geographical area, zip code, etc. associated with the second user.

The popularity score determination machine learning model may be configured to determine the second set of popularity scores based upon the second contextual information (and/or the second user engagement information). In some examples, the second set of popularity scores may be determined using one or more of the techniques provided herein with respect to determining the first set of popularity scores 540. The content system may take the second contextual information into account when determining the second set of popularity scores. The second contextual information associated with the second query 570 being different than the contextual information 534 associated with the first query 510 may result in (i) the fourth popularity score associated with the first internet resource being a different value than the first popularity score associated with the first internet resource, (ii) the second popularity score associated with the second internet resource being a different value than the fifth popularity score associated with the second internet resource, and/or (iii) the third popularity score associated with the third internet resource being a different value than the sixth popularity score associated with the third internet resource.

In some examples, based upon the second set of popularity scores, the content system may generate one or more second graphical popularity indicators and/or assign the one or more second graphical popularity indicators to one or more search results of the second set of search results. For example, the content system may (i) generate a fourth graphical popularity indicator 592 (shown in FIG. 5D) based upon the fourth popularity score associated with the fourth search result corresponding to the first internet resource, and/or (ii) assign the fourth graphical popularity indicator 592 to the fourth search result. The fourth graphical popularity indicator 592 may be indicative of the fourth popularity score (e.g., the fourth graphical popularity indicator 592 may comprise a visual representation of the fourth popularity score). Alternatively and/or additionally, the content system may (i) generate a fifth graphical popularity indicator 594 (shown in FIG. 5D) based upon the fifth popularity score associated with the fifth search result corresponding to the second internet resource, and/or (ii) assign the fifth graphical popularity indicator 594 to the fifth search result. The fifth graphical popularity indicator 594 may be indicative of the fifth popularity score (e.g., the fifth graphical popularity indicator 594 may comprise a visual representation of the fifth popularity score). Alternatively and/or additionally, the content system may (i) generate a sixth graphical popularity indicator 596 (shown in FIG. 5D) based upon the sixth popularity score associated with the sixth search result corresponding to the third internet resource, and/or (ii) assign the sixth graphical popularity indicator 596 to the sixth search result. The sixth graphical popularity indicator 596 may be indicative of the sixth popularity score (e.g., the sixth graphical popularity indicator 596 may comprise a visual representation of the sixth popularity score).

Figure 5D:
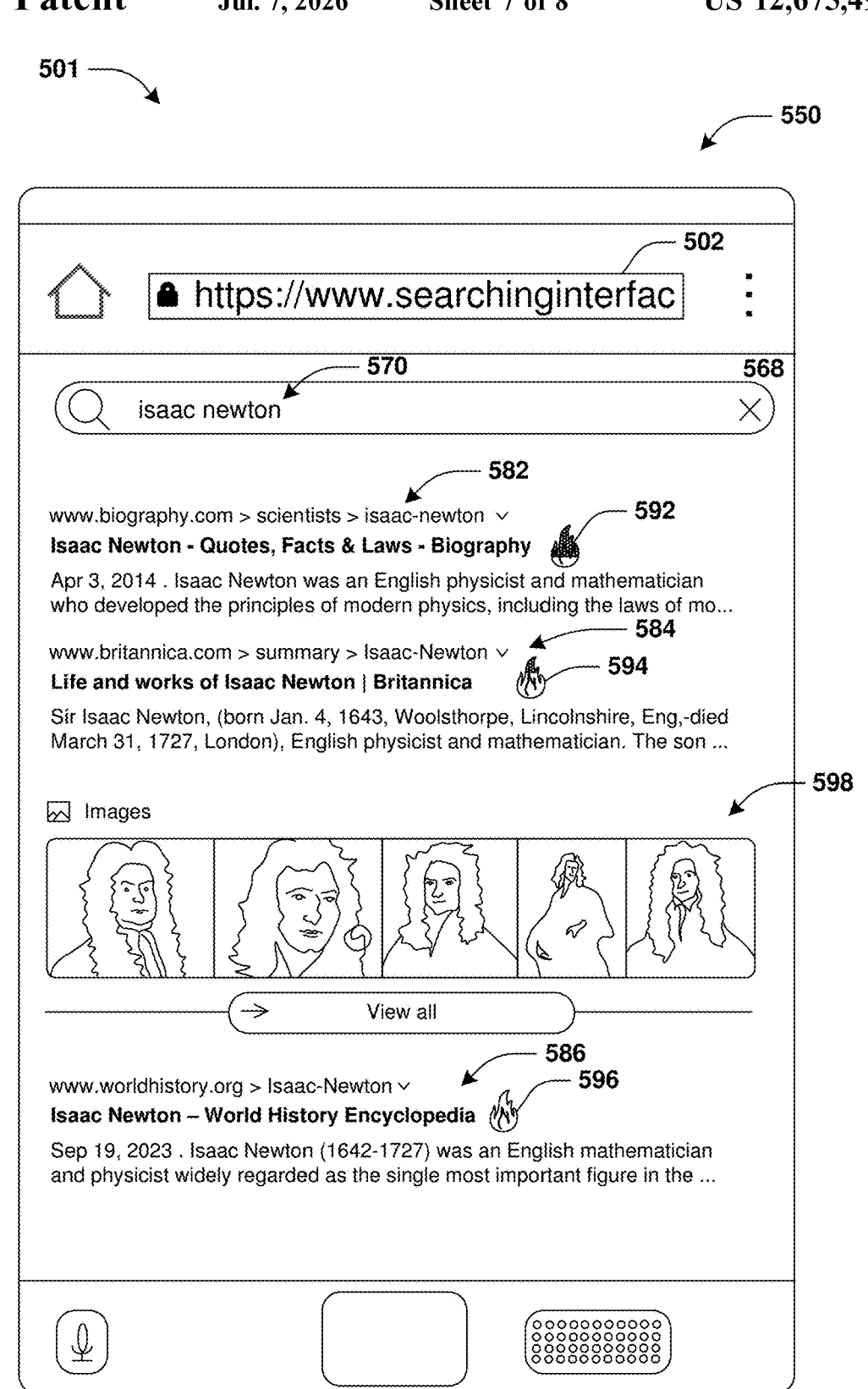
FIG. 5D is a component block diagram illustrating an example system for providing search results with popularity indicators, where graphical popularity indicators are displayed via a second search interface on a second client device.

FIG. 5D illustrates the content system displaying, on the second client device 550, the second search interface 568 comprising representations of search results of the second set of search results and/or the one or more one or more second graphical popularity indicators associated with search results of the second set of search results. For example, the second search interface 568 may display a fourth representation 582 of the fourth search result, a fifth representation 584 of the fifth search result, a sixth representation 586 of the sixth search result and/or one or more or more other representations of one or more other search results of the second set of search results. In some examples, representations of search results may be arranged based upon relevance rankings associated with the search results. For example, the second search interface 568 may display the fourth representation 582 of the fourth search result to be higher than and/or over the fifth representation 584 of the fifth search result based upon the fourth search result being ranked higher than the fifth search result with respect to relevance to the second query 570. In some examples, the second search interface 568 may display a set of image search results 598 associated with the second query 570.

In some examples, the second search interface 568 may display the fourth graphical popularity indicator 592 to be adjacent to the fourth representation 582 of the fourth search result and/or to overlay the fourth representation 582 of the fourth search result. The second search interface 568 may display the fifth graphical popularity indicator 594 to be adjacent to the fifth representation 584 of the fifth search result and/or to overlay the fifth representation 584 of the fifth search result. The second search interface 568 may display the sixth graphical popularity indicator 596 to be adjacent to the sixth representation 586 of the sixth search result and/or to overlay the sixth representation 586 of the sixth search result.

In some examples, a graphical popularity indicator of the one or more second graphical popularity indicators may comprise an icon, such as a flame icon shown in FIG. 5D or one or more other types of icons. A visual feature of the icon may be controlled based upon a popularity score that the graphical popularity indicator is configured to visually represent. In an example, the visual feature may correspond to a fill level of the flame icon. For example, the content system may determine one or more fill levels associated with the one or more second graphical popularity indicators based upon the second set of popularity scores.

In some examples, the second set of popularity scores may be normalized such that each popularity score of the second set of popularity scores fits within a common scale (e.g., 0 to 1 or other scale). In some examples, even though the fourth graphical popularity indicator 592 and the first graphical popularity indicator 572 are assigned to search results corresponding to the same internet resource (e.g., the first internet resource), the fourth graphical popularity indicator 592 and the first graphical popularity indicator 572 may be rendered to have different appearances due to the fourth popularity score being different than the first popularity score (which may be based upon at least one of a difference in location between the first location and the second location, a difference in age between the first age, and the second age, etc.).

In an example shown in FIG. 5D, the content system may (i) generate the fourth graphical popularity indicator 592 to comprise a flame icon with about a 20% fill level (e.g., about 20% of the flame icon is the first color and/or about 80% of the flame icon is the second color) based upon the fourth popularity score (e.g., based upon the fourth popularity score being equal to 0.4), (ii) generate the fifth graphical popularity indicator 594 to comprise a flame icon with about an 80% fill level (e.g., about 80% of the flame icon is the first color and/or about 20% of the flame icon is the second color) based upon the fifth popularity score (e.g., based upon the fifth popularity score being equal to 0.2), and/or (iii) generate the sixth graphical popularity indicator 596 to comprise a flame icon with about a 100% fill level (e.g., about 100% of the flame icon is the first color) based upon the sixth popularity score (e.g., based upon the sixth popularity score being equal to 1).

The fourth graphical popularity indicator 592 (associated with the first internet resource) provided to the second user may be rendered to have a different appearance than the first graphical popularity indicator 572 (associated with the first internet resource) provided to the first user due to the fourth popularity score being different than the first popularity score, which may be due, at least in part, to (i) the second location being different than the first location (e.g., the first internet resource may be more popular among users in and/or around the first location than among users in and/or around the second location), (ii) the second time of day being different than the first time of day (e.g., the first internet resource may be more popular among users that are browsing the Internet during the first time of day than among users that are browsing the Internet during the second time of day), (iii) the second device type being different than the first device type (e.g., the first internet resource may be more popular among users that are browsing the Internet using the first device type than among users that are browsing the Internet using the second device type), (iv) the second age being different than the first age, (v) the second gender being different than the first gender, and/or (vi) one or more other differences between the second contextual information associated with the second query 570 and the contextual information 534 associated with the first query 510.

It may be appreciated that using the techniques provided herein to take contextual information into account to determine popularity scores may result in users of the content system being provided with more accurate graphical popularity indicators (that more accurately represent popularity of a given search result and/or internet resource by taking contextual information into account, for example).

In some examples, one or more of the techniques provided herein with respect to determining popularity scores associated with search results and/or presenting graphical popularity indicators based upon the popularity scores may be used to determine popularity scores associated with content items and/or presenting graphical popularity indicators based upon the popularity scores. In an example, the content items may comprise a set of articles (e.g., news articles, informational articles, entertainment articles, educational articles, papers, journal entries, etc.). The set of articles may be determined based upon a query. Alternatively and/or additionally, the set of articles may be selected for inclusion in a curated list of articles for the first user. A set of popularity scores associated with the set of articles may be determined using one or more of the techniques provided herein with respect to determining the first set of popularity scores 540 associated with the first set of search results. One or more graphical popularity indicators associated with one or more articles of the set of articles may be generated based upon the set of popularity scores using one or more of the techniques provided herein with respect to generating the one or more first graphical popularity indicators. The content system may provide an article interface comprising representations of articles of the set of articles and the one or more graphical popularity indicators.

In some examples, one or more of the techniques provided herein with respect to determining popularity scores associated with search results and/or presenting graphical popularity indicators based upon the popularity scores may be used to determine popularity scores associated with query autosuggestions and/or presenting graphical popularity indicators based upon the popularity scores. In an example, in response to the first user entering text (e.g., at least a portion of the first query 510) into the search field 506 (shown in FIG. 5A), the content system may determine a set of query autosuggestions based upon the text (e.g., when the text is "isaac", the set of query autosuggestions may include at least one of "Isaac Newton", "Isaac Newton Biography, etc.). A set of popularity scores associated with the set of query autosuggestions may be determined using one or more of the techniques provided herein with respect to determining the first set of popularity scores 540 associated with the first set of search results. One or more graphical popularity indicators associated with one or more query autosuggestions of the set of query autosuggestions may be generated based upon the set of popularity scores using one or more of the techniques provided herein with respect to generating the one or more first graphical popularity indicators. The content system may provide an autosuggestion interface comprising representations of query autosuggestions of the set of query autosuggestions and the one or more graphical popularity indicators.

Implementation of at least some of the disclosed subject matter may lead to benefits including a reduction in screen space and/or an improved usability of a display (e.g., of the first client device 500 and/or the second client device 550) (e.g., as a result of graphical popularity indicators notifying users of popularity levels associated with search results).

In some examples, in response to a selection of the first representation 562 (shown in FIG. 5C) of the first search result 522, the search interface 508 may display a summary of the first internet resource. In an example in which the first internet resource comprises a first article, the first article may be summarized (using a natural language processing module, for example) to generate the summary. In an example in which the first internet resource comprises a first video, the first video may be transcribed automatically using a voice transcription module, and/or a transcription of the first video may be summarized (using a natural language processing module, for example) to generate the summary. In an example, the search interface 508 may display a graphical object, comprising the summary, on the first client device 500. In some examples, the graphical object may make up merely a portion of a display of the first client device 500. Alternatively and/or additionally, while the graphical object is displayed, in response to a selection (e.g., a click and/or a finger touch) of an area outside the graphical object (e.g., an area, of the display of the first client device 500, that is offset from the graphical object), the graphical object may be closed and/or no longer displayed (e.g., at least a portion of a graphical user interface displayed prior to the selection of the first representation 562 may be made visible by closing and/or no longer displaying the graphical object).

In some examples, the first client device 500 is configured to display a menu listing one or more features (e.g., selectable features) of the content system. The one or more features may comprise at least one of a search feature, a content feature, a messaging feature, a social media feed feature, etc. In an example, in response to a selection of the search feature, the search feature may provide the search interface 508. In response to a selection of the content feature, the content feature may provide one or more resources (e.g., data, an interface, etc.) for displaying and/or engaging with content items (e.g., videos, images, audio files, news articles, etc.). In response to a selection of the messaging feature, the messaging feature may provide one or more resources (e.g., data, an interface, etc.) for displaying and/or facilitating messaging conversations (e.g., private messaging conversations and/or public messaging conversations) between users of the content system (e.g., users of the content system may send messages to each other using the messaging feature of the content system). In response to a selection of the social media feed feature, the social media feed feature may provide one or more resources (e.g., data, an interface, etc.) for displaying social media posts and/or comments on a social media platform. In some examples, the first client device 500 is configured to display a content platform application summary that can be reached directly from the menu, wherein the content platform application summary displays a limited list of data offered within the one or more features. In some examples, each of the data in the limited list of data is selectable to launch the respective feature (of the one or more features) and enable the selected data to be seen within the respective feature. In some examples, the content platform application summary is displayed while the one or more features are in an un-launched and/or unopened state.

In some examples, at least some of the disclosed subject matter may be implemented on a client device, and in some examples, at least some of the disclosed subject matter may be implemented on a server (e.g., hosting a service accessible via a network, such as the Internet).

Figure 6:
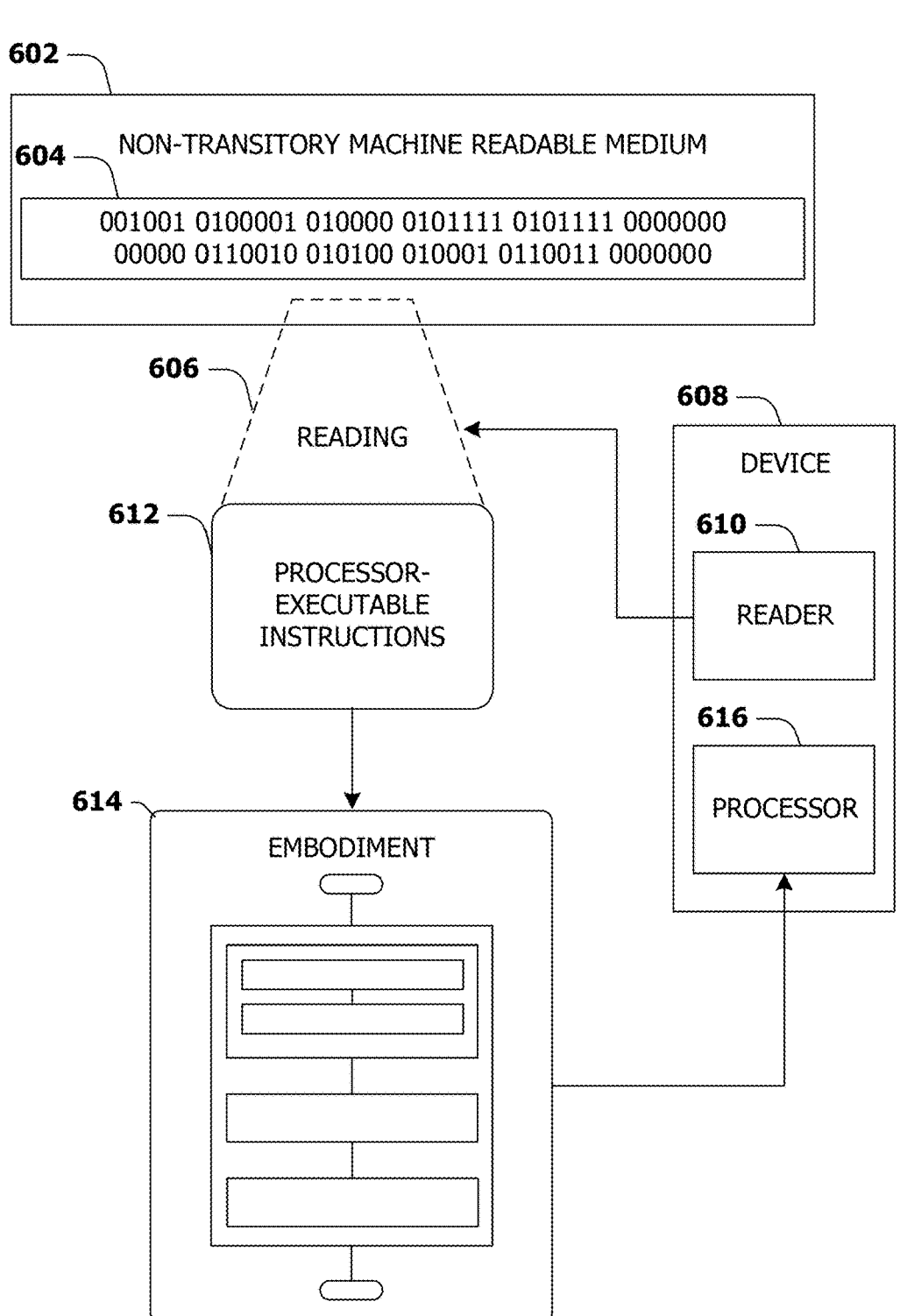
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5D, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
receiving, from a client device, a query;
in response to the query, generating a set of search results corresponding to a set of internet resources associated with the query, wherein the set of search results comprises a search result corresponding to a first internet resource;
displaying, on the client device, a search interface comprising a representation of the search result;
receiving one or more feedback signals indicative of one or more user reactions to display of the search interface on the client device;
determining one or more first user engagement metrics associated with the first internet resource based upon the one or more feedback signals;
receiving, from a second client device, a second query;
in response to the second query, generating a second set of search results corresponding to a second set of internet resources associated with the second query, wherein the second set of search results comprises a first search result corresponding to the first internet resource of the second set of internet resources;
determining a first popularity score associated with the first search result based upon the one or more first user engagement metrics associated with the first internet resource; and
displaying, on the second client device, a second search interface comprising:
a first representation of the first search result; and
a first graphical popularity indicator indicative of the first popularity score.

2. The method of claim 1, wherein:
determining the first popularity score is performed based upon contextual information associated with the second query.

3. The method of claim 2, comprising:
receiving, from a third client device, a third query;
in response to the third query, generating a third set of search results corresponding to a third set of internet resources associated with the third query, wherein the third set of search results comprises a third search result corresponding to the first internet resource;
determining a third popularity score associated with a third search result of the third set of search results based upon one or more third user engagement metrics associated with the first internet resource and third contextual information associated with the third query; and
displaying, on the third client device, a third search interface comprising:
a third representation of the third search result; and
a third graphical popularity indicator indicative of the third popularity score.

4. The method of claim 3, wherein:
the third popularity score is determined to be different than the first popularity score based upon the third contextual information associated with the third query being different than the contextual information associated with the second query.

5. The method of claim 4, wherein:
the third graphical popularity indicator is rendered to have a different appearance than the first graphical popularity indicator based upon the third popularity score being different than the first popularity score.

6. The method of claim 2, wherein:
the contextual information is indicative of a first location associated with the second client device.

7. The method of claim 6, comprising:
receiving, from a third client device, a third query;
in response to the third query, generating a third set of search results corresponding to a third set of internet resources associated with the third query, wherein the third set of search results comprises a third search result corresponding to the first internet resource;
determining a third popularity score associated with a third search result of the third set of search results based upon one or more third user engagement metrics associated with the first internet resource and third contextual information associated with the third query, wherein the third contextual information is indicative of a third location associated with the third client device; and
displaying, on the third client device, a third search interface comprising:
a third representation of the third search result; and
a third graphical popularity indicator indicative of the third popularity score.

8. The method of claim 7, wherein:
the third popularity score is determined to be different than the first popularity score based upon the third location being different than the first location.

9. The method of claim 1, comprising:
determining a third popularity score associated with a third search result of the second set of search results based upon one or more third user engagement metrics associated with a third internet resource corresponding to the third search result; and displaying, via the second search interface, a third representation of the third search result and a third graphical popularity indicator indicative of the third popularity score.

10. A non-transitory machine-readable medium having stored thereon processor-executable instructions that when executed cause performance of operations, the operations comprising:

receiving, from a client device, a query;

in response to the query, generating a set of search results corresponding to a set of internet resources associated with the query, wherein the set of search results comprises a first search result corresponding to a first internet resource of the set of internet resources;

determining a first popularity score associated with the first search result based upon one or more first user engagement metrics associated with the first internet resource and contextual information associated with the query;

displaying, on the client device, a search interface comprising:

a first representation of the first search result; and a first graphical popularity indicator indicative of the first popularity score;

receiving, from a second client device, a second query;

in response to the second query, generating a second set of search results corresponding to a second set of internet resources associated with the second query, wherein the second set of search results comprises a second search result corresponding to the first internet resource;

determining a second popularity score associated with a second search result of the second set of search results based upon one or more second user engagement metrics associated with the first internet resource and second contextual information associated with the second query; and displaying, on the second client device, a second search interface comprising:

a second representation of the second search result; and a second graphical popularity indicator indicative of the second popularity score.

11. The non-transitory machine-readable medium of claim 10, the operations comprising:

prior to receiving the query, receiving, from a third client device, a third query;

in response to the third query, generating a third set of search results corresponding to a third set of internet resources associated with the third query, wherein the third set of search results comprises a third search result corresponding to the first internet resource;

displaying, on the third client device, a third search interface comprising a third representation of the third search result;

receiving one or more feedback signals indicative of one or more user reactions to display of the third search interface on the third client device; and determining the one or more first user engagement metrics associated with the first internet resource based upon the one or more feedback signals.

12. The non-transitory machine-readable medium of claim 10, wherein:

the second popularity score is determined to be different than the first popularity score based upon the second contextual information associated with the second query being different than the contextual information associated with the query.

13. The non-transitory machine-readable medium of claim 12, wherein:

the second graphical popularity indicator is rendered to have a different appearance than the first graphical popularity indicator based upon the second popularity score being different than the first popularity score.

14. The non-transitory machine-readable medium of claim 10, wherein:

the contextual information is indicative of a first location associated with the client device.

15. The non-transitory machine-readable medium of claim 14, the operations comprising:

receiving, from a third client device, a third query;

in response to the third query, generating a third set of search results corresponding to a third set of internet resources associated with the third query, wherein the third set of search results comprises a third search result corresponding to the first internet resource;

determining a third popularity score associated with a third search result of the third set of search results based upon one or more third user engagement metrics associated with the first internet resource and third contextual information associated with the third query, wherein the third second contextual information is indicative of a third location associated with the third client device; and displaying, on the third client device, a third search interface comprising:

a third representation of the third search result; and a third graphical popularity indicator indicative of the third popularity score.

16. The non-transitory machine-readable medium of claim 10, wherein:

the contextual information is indicative of a location associated with the client device; and the second contextual information is indicative of a second location associated with the second client device.

17. The non-transitory machine-readable medium of claim 10, wherein:

the second contextual information is indicative of a second location associated with the second client device.

18. A computing device comprising:

a processor; and memory comprising processor-executable instructions that when executed by the processor cause performance of operations, the operations comprising:

receiving, from a client device, a query;

in response to the query, generating a set of search results corresponding to a set of internet resources associated with the query, wherein the set of search results comprises a first search result corresponding to a first internet resource of the set of internet resources;

determining a first popularity score associated with the first search result based upon one or more first user engagement metrics associated with the first internet resource;

determining a second popularity score associated with a second search result of the set of search results based upon one or more second user engagement metrics associated with a second internet resource corresponding to the second search result; and displaying, on the client device, a search interface comprising:

a first representation of the first search result;

a first graphical popularity indicator indicative of the first popularity score;

a second representation of the second search result; and a second graphical popularity indicator indicative of the second popularity score, wherein the second graphical popularity indicator is rendered to have a different appearance than the first graphical popularity indicator based upon the second popularity score being different than the first popularity score.

19. The computing device of claim 18, the operations comprising:

prior to receiving the query, receiving, from a second client device, a second query;

in response to the second query, generating a second set of search results corresponding to a second set of internet resources associated with the second query, wherein the second set of search results comprises a third search result corresponding to the first internet resource;

displaying, on the second client device, a second search interface comprising a third representation of the third search result;

receiving one or more feedback signals indicative of one or more user reactions to display of the second search interface on the second client device; and determining the one or more first user engagement metrics associated with the first internet resource based upon the one or more feedback signals.

20. The computing device of claim 18, wherein:

a second fill level of the second graphical popularity indicator is visually different than a first fill level of the first graphical popularity indicator.

\*    \*    \*    \*    \*